United States Patent Office 2,776,200
Patented Jan. 1, 1957

2,776,200

PRODUCTION OF METAL POWDER FROM CARBONYL

Albert Edward Wallis, Pembury, near Tunbridge Wells, England, assignor to The International Nickel Company, Inc., New York, N. Y.

No Drawing. Application December 18, 1953, Serial No. 399,145

Claims priority, application Great Britain December 18, 1952

14 Claims. (Cl. 75—.5)

It is well known that the decomposition of carbonyls of metals, such as iron, nickel and cobalt, in the hot free space of a decomposer leads to the formation of metal in fine particulate form. Mixtures of carbonyls of two or more metals can also be decomposed simultaneously to give an intimate mixture of the metals, which may be alloyed by subsequent heat-treatment. The powders or powder mixtures produced have many uses in powder metallurgy and in particular can be used for making magnetic cores for use with high frequencies. For this use it is highly advantageous that the particles making up the powder should not vary greatly in size and their size should be small, for instance of the order of 3 to 4 microns or less in diameter.

The decomposition of the carbonyl is greatly assisted by the presence of nuclei in the hot free space of the decomposer. In the decomposition processes which have been used generally hitherto these nuclei are provided by the first metallic particles formed, with the result that the metal particles grow in size, since decomposition tends to take place on the particles already formed rather than in the free space to form new particles. It has, however, been proposed to introduce finely-divided solid substances into the decomposing vessel to exert a catalytic action on the decomposition, and also to introduce the vapour of a liquid into the vessel so that decomposition of the carbonyl will take place on the liquid nuclei formed by condensation in the hot free space.

It is an object of the invention to provide a process by which metal powder of small and uniform particle size is produced by the thermal decomposition of metal carbonyl in the heated free space of a decomposer.

It is a further object of the invention to provide a process for carrying out the thermal decomposition of metal carbonyl in the heated free space of a decomposer in the presence of solid nuclei to give metal powder of small and uniform particle size.

A third object of the invention is to provide a process of producing, in the form of a fume of solid particles, nuclei for the thermal decomposition of metal carbonyl within the heated free space of a decomposer.

Further objects of the invention will appear from the following description.

According to this invention non-volatile solid nuclei for the decomposing carbonyl are formed by the substantially instantaneous reaction of a very small amount of a reagent capable of reacting substantially instantaneously with carbonyl vapour at low temperatures, with either carbonyl flowing to the heated free space of a decomposer or the carbonyl within the heated free space.

It is desirable that the nuclei should be uniformly distributed throughout the hot free space in which the decomposition takes place. This is ensured most easily if the reaction takes place externally of the vessel, and preferably the reagent is brought into contact with the carbonyl flowing to the hot free space in the decomposing vessel to be decomposed there. This flowing stream is usually at a low temperature, of the order of 50° C., and accordingly the reagent added to it should be capable of reacting substantially instantaneously with the carbonyl vapour at this temperature. If it reacts substantially instantaneously at the temperature of the flowing stream, the nucleus formation will be complete when the gases enter the space, even though the period of time within which ingoing carbonyl and the reagent are in contact with one another may be very short. Provided that the reagent can react substantially instantaneously with the carbonyl at a low temperature, i. e. one below that of the decomposition of the carbonyl, the reaction will in any case be complete before the carbonyl begins to decompose. Examples of reagents which react substantially instantaneously at low enough temperatures are the halogens, nitric acid and hydrochloric acid. Of the halogens, chlorine, bromine and iodine are satisfactory, but the high reactivity of fluorine necessitates considerable practical precautions. On the other hand, at the temperatures both of the ingoing carbonyl and in the decomposing vessel near the carbonyl inlet, oxygen reacts only slowly and so neither oxygen nor a gas yielding it is a reagent used according to the invention.

When the reaction takes place externally it is not necessary to bring the reagent into contact with the main carbonyl stream, but the carbonyl vapour may be mixed with the products of a complete reaction of a carbonyl (which may be different from that to be decomposed) with some other compound, and this carbonyl may be at any convenient temperature. The solid particles produced in this or other ways may, for example, be metal oxides, salts, sulphides, carbonates or carbon. Particularly advantageously they may be fume produced by the reaction between carbonyl vapour and either bromine or nitric acid. The reaction with nitric acid may be carried out by allowing the carbonyl to bubble through the acid in a container. The fume of solid nuclei produced is stable and does not readily settle.

When the nuclei are wholly formed inside the decomposer, the reagent may be introduced into the hot free space as a gas, either alone or in a stream of diluent gas. It may be a halogen, acetyl chloride or hydrogen chloride. In order to ensure as uniform as possible a distribution of nuclei throughout the hot free space in which the decomposition occurs, the reagent is preferably introduced into the hot free space at a point where the carbonyl has not yet attained the temperature at which it thermally decomposes.

Only a very small quantity of the particles which form the nuclei is required, and indeed if too large an amount is used the powder ceases to be of small particle size and resembles cotton wool. It is for this reason that the amount of the reagent used must be very small. The amount required varies with the reagent, and it is impossible to give limits of general applicability, but in any given case the appearance of a product resembling cotton wool is an immediate indication that too much reagent is being used since powder produced according to the invention consists wholly or substantially wholly of small discrete particles.

By using the method of this invention metal powders having a very regular particle size are produced, and moreover, and possibly more important, the particles are of very small diameter. Moreover, the formation of nuclei according to the invention enables fine powders to be made at lower temperatures than would be needed in their absence and thus avoids the need for operating at temperature ranges such that cotton-wool powder tends to form. In fact the range of both temperature and carbonyl concentration over which very fine discrete particles can be obtained is considerably extended.

Example 1

Iron carbonyl vapour was introduced into a decomposer together with the fumes produced by the action of nitric acid on iron carbonyl. The fumes were made up of a suspension of very fine particles of basic iron nitrate in the carbonyl, and these formed the nuclei for the decomposition of the iron carbonyl. The conditions in the decomposer were such as would normally have produced a high-density powder having an average particle size of 5 to 6 microns in diameter. The presence of 0.001% (by weight) of the basic iron nitrate fume so affected the decomposition of the iron carbonyl that a powder having an average particle size of only 3 microns was produced. By way of contrast, increasing the weight of the fume to 0.003% produced a powder resembling cotton wool.

To produce very fine particles the carbonyl vapour may be diluted, preferably with carbon monoxide, but the lower the vapour concentration, the less powder can be made in a given time, and it is therefore economically desirable to work at as high a vapour concentration as possible and to employ the maximum amount of reagent that will produce a fine particle size without causing the powder to resemble cotton wool. An example of a process carried on with dilution of the gas, showing also the effect of varying the amount of reagent, is as follows:

Example II

Using a feed consisting of 57% by volume iron carbonyl and the balance carbon monoxide, with a temperature of 300° C. in the hot free space, measured by means of a thermocouple placed six inches from the wall and six feet from the top of a standard 1 meter diameter decomposer, the particle sizes obtained by the introduction of varying quantities of bromine vapour into the feed to form fume were as follows:

| Percentage by volume of bromine vapour on total incoming gases | Particle size |
| --- | --- |
| 0% | 5.75 microns. |
| 0.0001% | 4.80 microns. |
| 0.0002% | 2.39 microns. |
| 0.0005% | "Cotton wool" powder. |

In the absence of bromine the temperature would have had to be 340° C. or more in order to obtain a particle size of 2.39 microns.

I claim:

1. A process for the production of metal powder of small particle size by the thermal decomposition of metal carbonyl vapour in a hot free space, characterised in that non-volatile solid nuclei for the decomposing carbonyl are formed by the substantially instantaneous reaction of a very small amount of a reagent, capable of reacting substantially instantaneously with carbonyl vapour at low temperatures, with either carbonyl flowing to the space or the carbonyl within the space.

2. A process for the production of metal powder of small particle size by the thermal decomposition of metal carbonyl vapour in a hot free space, characterised in that a very small amount of a reagent, capable of reacting substantially instantaneously with the carbonyl vapour at temperatures below that at which thermal decomposition of the carbonyl occurs to form non-volatile solid particles, is brought into contact with the carbonyl flowing to the hot free space to be decomposed there.

3. A process according to claim 2 in which the reagent is such that the reaction takes place substantially instantaneously with the flowing carbonyl before it enters the decomposing vessel.

4. A process according to claim 3 in which the solid particles are in the form of fume produced by the action of at least one reagent from the group consisting of halogens, nitric acid and hydrochloric acid on the flowing carbonyl.

5. A process according to claim 1 in which the nuclei are formed inside the decomposing vessel by introducing at least one reagent from the group consisting of halogens, acetyl chloride and hydrogen chloride as a gas into the hot free space.

6. A process according to claim 5 in which the reagent is introduced into the hot free space at a point where the carbonyl has not yet attained the temperature at which it thermally decomposes.

7. A proces for the production of metal powder of small particle size by the thermal decomposition of metal carbonyl vapor in a hot free space comprising flowing metal carbonyl vapor to the hot free space to be decomposed therein, bringing a very small amount of nitric acid into contact with said metal carbonyl vapor to form fume while it is flowing to the hot free space, the amount of nitric acid added being sufficient to produce a metal powder having a fine particle size and less than an amount that will cause the powder to resemble cotton wool.

8. A process for the production of metal powder of small particle size by the thermal decomposition of metal carbonyl vapor in a hot free space comprising flowing a mixture of about 57% metal carbonyl vapor and the balance substantially carbon monoxide to the hot free space to be decomposed therein, maintaining the temperature in the hot free space at approximately 300° C., bringing a very small amount of bromine vapor into contact with said metal carbonyl vapor to form fume while it is flowing to the hot free space, the amount of bromine vapor added being sufficient to produce a metal powder having a fine particle size and less than an amount that will cause the powder to resemble cotton wool.

9. A process for the production of metal powder, formed substantially wholly of small discrete particles, by thermal decomposition of metal carbonyl vapor in a hot free space comprising forming non-volatile solid nuclei for the thermal decomposition of metal carbonyl by the reaction of a very small amount of a reagent, capable of reacting substantially instantaneosuly with carbonyl vapor to form non-volatile solid particles at temperatures below that at which thermal decomposition of the carbonyl occurs, with either carbonyl flowing to the hot free space or the carbonyl within the hot free space.

10. A process for the production of metal powder, formed substantially wholly of small discrete particles, by thermal decomposition of metal carbonyl vapor in a hot free space comprising bringing a very small amount of a reagent, capable of reacting substantially instantaneously with carbonyl vapor at temperatures below that at which the thermal decomposition of the carbonyl occurs, into contact with carbonyl vapor to react therewith and form non-volatile solid particles, mixing the products of the reaction with the metal carbonyl vapor to be decomposed in the hot free space.

11. A process for the production of metal powder, formed substantially wholly of small discrete particles, by thermal decomposition of metal carbonyl vapor in a hot free space comprising flowing a main stream of metal carbonyl vapor to the hot free space to be decomposed therein; bringing a very small amount of a reagent, capable of reacting substantially instantaneously with carbonyl vapor at temperatures below that at which the thermal decomposition of the carbonyl occurs, into contact with carbonyl vapor to react therewith and form non-volatile solid particles; and mixing the products of the reaction with the main stream of metal carbonyl vapor while it is flowing to the hot free space.

12. A process for the production of metal powder, formed substantially wholly of small discerte particles, by thermal decomposition of metal carbonyl vapor in a hot free space comprising flowing a main stream of metal carbonyl vapor to the hot free space to be decomposed therein; bringing a very small amount of a reagent, capable of reacting substantially instantaneously with carbonyl vapor at temperatures below that at which the thermal decomposition of the carbonyl occurs, into contact with carbonyl vapor to react therewith and form non-volatile solid particles, and introducing the products of the reaction into the decomposing vessel.

13. A process for the production of metal powder formed substantially wholly of small discrete particles by thermal decomposition of metal carbonyl vapor in a hot free space of a decomposer comprising bringing a very small amount of a reagent, capable of reacting substantially instantaneously with carbonyl vapor to form non-volatile solid particles at temperatures below that at which thermal decomposition of the carbonyl occurs, into contact with the metal carbonyl within the hot free space.

14. A process for the production of metal powder, formed substantially wholly of small discrete particles, by thermal decomposition of metal carbonyl vapor in a hot free space comprising bringing a very small amount of a reagent, capable of reacting substantially instantaneously with carbonyl vapor to form non-volatile solid particles at temperatures below that at which the thermal decomposition of the carbonyl occurs, into contact with carbonyl vapor to react therewith and form non-volatile solid particles or nuclei for the thermal decomposition of the metal carbonyl in the hot free space and maintaining the hot free space at a temperature at which thermal decomposition of the carbonyl occurs but at a lower temperature than would be required to produce a powder of substantially the same particle size in the absence of the reagent, the amount of reagent added being sufficient to produce a metal powder having a fine particle size and less than an amount that will cause the metal powder produced to resemble cotton wool.

References Cited in the file of this patent
FOREIGN PATENTS 73,639    Denmark _____ Jan. 14, 1952